(12) United States Patent
Dinardo, Sr. et al.

(10) Patent No.: US 9,218,613 B2
(45) Date of Patent: Dec. 22, 2015

(54) METHOD AND SYSTEM FOR INTERNET BASED INTERACTIVE REVERSE MARKETING COMMUNICATION VIA SMS/MMS/EMS COMMUNICATIONS NETWORK

(71) Applicant: Monkeetech, LLC, West Babylon, NY (US)

(72) Inventors: Jeffrey Neil Dinardo, Sr., Islip, NY (US); Jeffrey Neil Dinardo, Jr., East Moriches, NY (US)

(73) Assignee: MONKEETECH, LLC, West Babylon, NY (US)

(*) Notice: Subject to any disclaimer, the term of this patent is extended or adjusted under 35 U.S.C. 154(b) by 0 days.

(21) Appl. No.: 13/998,801

(22) Filed: Dec. 9, 2013

(65) Prior Publication Data

US 2014/0156407 A1 Jun. 5, 2014

Related U.S. Application Data

(60) Provisional application No. 61/850,506, filed on Feb. 15, 2013.

(51) Int. Cl.
| | |
|---|---|
| G06Q 30/00 | (2012.01) |
| H04L 12/00 | (2006.01) |
| G06Q 30/02 | (2012.01) |
| H04W 4/20 | (2009.01) |
| H04L 12/58 | (2006.01) |
| H04L 12/18 | (2006.01) |
| H04W 4/14 | (2009.01) |
| H04W 12/08 | (2009.01) |

(52) U.S. Cl.
CPC ........ *G06Q 30/0258* (2013.01); *G06Q 30/0267* (2013.01); *H04L 12/1859* (2013.01); *H04L 51/38* (2013.01); *H04W 4/206* (2013.01); *H04W 4/14* (2013.01); *H04W 12/08* (2013.01)

(58) Field of Classification Search
CPC .................................................. G06Q 30/0267
USPC ....................................................... 705/14.64
See application file for complete search history.

(56) References Cited

U.S. PATENT DOCUMENTS

| | | |
|---|---|---|
| 6,721,578 B2 | 4/2004 | Chmaytelli |
| 6,947,772 B2 | 9/2005 | Minear |

(Continued)

*Primary Examiner* — John G Weiss
*Assistant Examiner* — Scott C Anderson

(57) ABSTRACT

The present invention is a short message service ("SMS") based interactive information and marketing system, which provides the User with a means to rapidly and effectively communicate with its customer base. The system represented by this invention is a completely voluntary, opted-in system, by which the customer provides its mobile telephone number or the telephone number of its chosen mobile device to the User and requests that the User forward marketing, promotional and informational materials to the customer. The present invention permits the customer to request that certain product specific information be transmitted by the User to the customer visa short message service ("SMS") text, as said information becomes available. The present invention permits both the User and the customer to transmit a URL link from the User's website to a mobile number via short message service ("SMS") text directly from the web site page. The present invention permits the User to forward via short message service ("SMS") text, a Short Cut Icon to reside on the home page of the customer's mobile phone or mobile device, which when clicked, will act as a short-cut to the User's web site.

14 Claims, 14 Drawing Sheets

(56) References Cited

U.S. PATENT DOCUMENTS

| Patent Number | Date | Inventor | Citation |
|---|---|---|---|
| 7,065,388 B2 | 6/2006 | Minear | |
| 7,321,920 B2 | 1/2008 | Washburn | |
| 7,505,935 B2 | 3/2009 | Mendola | |
| 8,086,488 B2 | 12/2011 | Liu | |
| 8,156,005 B2 | 4/2012 | Vieri | |
| 8,224,362 B1 | 7/2012 | Osinga | |
| 8,359,014 B2 * | 1/2013 | Olincy et al. | 455/414.1 |
| 8,577,401 B1 | 11/2013 | Osinga | |
| 8,645,484 B2 | 2/2014 | Ferrell | |
| 8,660,613 B2 | 2/2014 | Minear | |
| 8,725,632 B2 | 5/2014 | Tompkins | |
| 2007/0298842 A1 | 12/2007 | Kamada | |
| 2010/0094710 A1 | 4/2010 | Ramakrishna | |
| 2010/0121709 A1* | 5/2010 | Berezin et al. | 705/14.51 |
| 2010/0205053 A1 | 8/2010 | Shuster | |
| 2010/0132694 A2 | 12/2010 | Homeier-Beals | |
| 2012/0092161 A1* | 4/2012 | West | 340/540 |
| 2012/0253990 A1* | 10/2012 | Skala | 705/27.1 |
| 2013/0218595 A1 | 8/2013 | Burkett | |

* cited by examiner

Send2Mobile: QualityDoor.com

Please enter your mobile phone numbers and/or email address to be signed up for our exclusive messaging service and to send the Quality Door Web Application to your Mobile Devices.

First Name:

[          ] ←—1.1

*Please enter your first name.*

Last Name:

[          ] ←—1.2

*Please enter your last name.*

Mobile Phone:

[                    ] ←—1.3

*Please enter phone numbers one per line.*

Email Addresses:

[                    ] ←—1.4

*Please enter email addresses one per line.*

☐ ←—1.5 Check here if you would like the Quality Door Web Application sent to your mobile devices.

[Submit] ←—1.6

Figure 1

Thank You! ← 2.1

You have been signed up for our exclusive messaging service!

Figure 2

Send2Mobile Administrator Panel: QualityDoor.com

Please enter the mobile phone numbers
to send the page to.

Mobile Phone:

⟵ 4.1

*Please enter phone numbers one per line.*

[Submit] ⟵ 4.2

Figure 4

Send2Mobile Visitors Panel: QualityDoor.com

Please enter the mobile phone numbers to send this page to.

First Name:

[            ] ←— 6.1

*Please enter your first name.*

Last Name:

[            ] ←— 6.2

*Please enter your last name.*

Mobile Phone:

[                    ] ←— 6.3

*Please enter phone numbers one per line.*

☐ *Check here if you would like to use Let Me Know* ←— 6.4

[ Let Me Know When... ⇕ ] ←— 6.5

[ Submit ] ←— 6.6

Figure 6

Send2Mobile Visitors Panel: QualityDoor.com

Please enter the mobile phone numbers to send this page to.

First Name:

[              ] ← 6.1

*Please enter your first name.*

Last Name:

[              ] ←6.2

*Please enter your last name.*

Mobile Phone:

[                              ] ←6.3

*Please enter phone numbers one per line.*

☐ Check here if you would like to use Let Me Know ←6.4

[ Let Me Know When... ⇕ ] ←6.5

| Let Me Know when... |
| The price changes | ←7.1
| This item is back in stock | ←7.2
| There is a bid on this item | ←7.3
| This item is sold | ←7.4
| There are any updates | ←7.5

Figure 7

| FirstName | LastName | Phone | Email | Type | ProductNumber |
|---|---|---|---|---|---|
| John | Smith | 7275555555 | john@mail.com | Price | 7451258963 |
| Jane | Doe | 9005553333 | janed@email.com | Sold | 2658741269 |
| Kevin | Everyman | 3789999999 | kevin@email.net | Bid | 3584621654 |
| Tim | Johnson | 2928888888 | tim@emails.com | Stock | 6846213845 |
| Ethan | Brown | 2223335555 | ebrown@email.com | Price | 5621858513 |

Figure 14

METHOD AND SYSTEM FOR INTERNET BASED INTERACTIVE REVERSE MARKETING COMMUNICATION VIA SMS/MMS/EMS COMMUNICATIONS NETWORK

BACKGROUND OF INVENTION

1. Field of Invention

This invention relates to a marketing and information system by which businesses, institutions, and organizations can market to and electronically communicate information to a highly targeted, voluntarily opted-in group of customers via the use of short message services ("SMS") text and instant messages provided to smart phones; iPhones; iPads, Android type mobile phones; and other similar mobile devices capable of, receiving short messages service texts ("SMS") or instant messages.

2. Description of Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light only, and not as admissions of prior art.

Currently, there exists the ability to display short text messages ("SMS") texts on mobile phones, smart phones, iPhones, Android type mobile phones and other mobile devices capable of receiving short message services such as tablets; iPads and other enabled notebooks. This invention envisions the use of SMS text messages as a means of direct marketing; advertising of goods and services; notice of events; communication of alerts; reminders of appointments and platforms for special offers, coupons and links to informational sites.

Available statistics within the industry evidence that the average mobile phone user looks at their mobile phone 150 times a day. The same survey indicates that 95% of SMS text messages are read within the first 5 minutes after receipt and that the average redemption rate for mobile coupons is at 20%. With the significant growth of the mobile phone market and the general acceptance and common use of SMS text messages, there is a defined opportunity for the use of the technology represented by this present invention.

It is crucial to understand that the present invention utilizes what is commonly referred to in the industry as an "opt-in" service and so it is the mobile phone user who actually agrees with and initiates the service represented by this invention. In this way, the invention is truly user friendly. Unsolicited SMS text messages, commonly referred to as "spam" are highly regulated and are generally looked upon as a nuisance in the mobile phone industry. Therefore, the "opt-in" embodiment of the present invention, effectively and legally overcomes that negative factor and "spam" problem.

As compared to other types of direct marketing such as direct mailers; e-mail advertising and telephone solicitations, the SMS text messaging marketing system embodied by this invention provides the consumer with a quick and simple method of response utilizing SMS texting on their mobile phones or SMS enabled mobile devices. Typical mobile phone users are in constant possession of their phones as they go about the business of their day. The SMS text message, which arrives on their mobile phone therefore, will be most likely attended to in the first 5 minutes after receipt and can be responded to in a quick and simple fashion, for example by calling a number or clicking a link to redeem a coupon, make a reservation, confirm an appointment or even make a direct purchase.

The SMS text message marketing made possible by this invention is: (i) first and foremost "permission based", that is that the SMS text message will only be sent to customers who have previously "opted-in" to receive such messages; (ii) a mass communication tool because of the high percentage of consumers who currently use mobile phones or mobile communication devices capable of receiving SMS text messages; (iii) instantaneous, since SMS text messages can be sent in a matter of seconds or can be programmed to be delivered at the exact time and date to be most likely read by the consumer; and (iv) interactive because it allows the customer to respond to the text message sent via this present invention.

BRIEF SUMMARY OF THE INVENTION

The present invention is a short message service ("SMS") based interactive information and marketing system, which provides the User with a means to rapidly and effectively communicate with its customer base. The system represented by this invention is a completely voluntary, opted-in system, by which the customer provides its mobile telephone number or the telephone number of its chosen mobile device to the User and requests that the User forward marketing, promotional and informational materials to the customer. The present invention permits the customer to request that certain product specific information be transmitted by the User to the customer visa short message service ("SMS") text, as said information becomes available. The present invention permits both the User and the customer to transmit a URL link from the User's website to a mobile number via short message service ("SMS") text directly from the web site page. The present invention permits the User to forward via short message service ("SMS") text, a Short Cut Icon to reside on the home page of the customer's mobile phone or mobile device, which when clicked, will act as a short-cut to the User's web site.

BRIEF DESCRIPTION OF THE DRAWINGS

These and other features, aspects and advantages of the present disclosure will become better understood when the following detailed description is read with reference to the accompanying drawings in which like characters represent like parts throughout the drawings, wherein:

FIG. 1 is a view of the pop-up screen, which appears on the customer's device prompting the customer to enter certain identifying and contact information.

FIG. 2 is a view of the pop-up screen, which appears on the customer's device, alerting the customer that he/she has successfully opted-in to the User's messaging services offered in accordance with the embodiment.

FIG. 4 is a view of the User's Administration Panel, located on the back-end of the User's website, accessible only to the User secured by passcode and pin number, permitting the User to enter the opted-in customer's mobile number in accordance with one embodiment.

FIG. 6 is a view of a pop-up screen, which appears on the customer's mobile device and permits the opted-in customer to submit his/her name; mobile number(s) and to select if the customer chooses to use the "Let Me Know" feature of the present disclosure, in accordance with one embodiment.

FIG. 7 is a view of the pop-up screen identified previously in FIG. 6 and show in detail, the drop down selection menu available to the opted-in customer to select in order for the customer to choose an item which customer would opt for the User to inform the customer about by future text message, as item or information becomes available to the User, in accordance with one embodiment.

FIG. 14 is a view of the Let Me Know Administration File, which is located on the back-end of the User's website, accessible only to the User and which contains the opted-in customer's name, mobile number(s), e-mail address, Let Me Know request item and specific product number, all in accordance with one embodiment.

DETAILED DESCRIPTION OF SPECIFIC EMBODIMENTS

One or more of the specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made in order to achieve the developers' specific goals, such as compliance with system related and business related constraints, which may vary from implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to techniques for obtaining a customer's permission by way of an opt-in procedure, to forward to said customer, via "short message services" ("SMS") product or services information, pricing information, special sale and discount information, availability of product or services information, coupons for purchase of products or services, link to User's URLs for landing page and product pages and ability of customer to send link to User URLs for landing page and product pages to other mobile devices via short message services ("SMS").

FIG. 1 and FIG. 7 illustrate the techniques utilized for the customer "opt-in" procedure to the User's web-based SMS text messaging system. On the User's web site landing page, each product page and on the check-out page, the customer will view a S2M icon. When the customer clicks on the S2M icon, a pop-up screen will appear, as illustrated in FIG. 1, which will prompt the customer to choose to enter their name, mobile telephone number(s) and e-mail address(es). If the customer elects not to enter the information requested, the pop-up window will close and the opt-in procedure is ended. FIG. 1. If the customer elects to enter the information requested, the information is entered into the pop-up window form: FIG. 1.1 First Name; FIG. 1.2 Last Name; FIG. 1.3 Mobile Phone Number(s); FIG. 1.4 E-mail Address(es); FIG. 1.5 and the User's Web Application Icon link is sent to mobile device's home screen.

Figure 3:
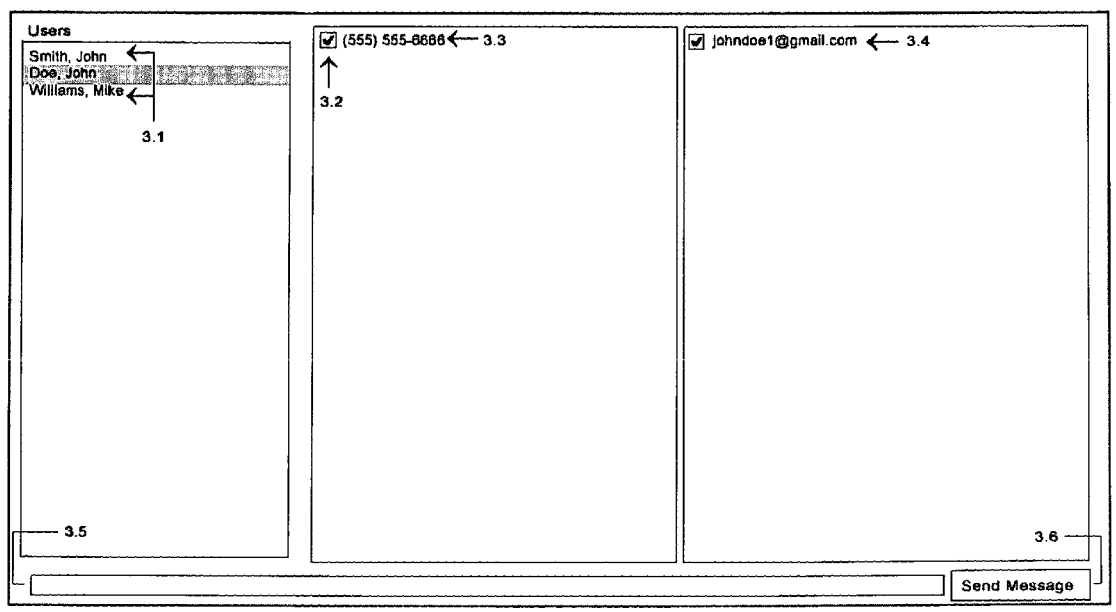
FIG. 3 is a view of the User's Administration File, which stores the opted-in customer's name, mobile telephone number(s) and e-mail address in accordance with one embodiment.

After the customer has entered its information onto the pop-up window form, FIG. 1, the information collected is then sent to and stored in the User's Administration File, FIG. 3, and if the customer elected, the User's Web Application Short-Cut Icon is sent by short message service (SMS) to customer's mobile phone. The customer receives a Confirmation of the successful opt-in by short message service (SMS) FIG. 2.1. The customer can then, from that point forward, directly access the User's web site by selecting the User's Web Application Short-Cut Icon from the mobile device's home page.

Once the customer has been opted-in to the system and the customer's information is stored in the User's Administration File, the User can communicate with and directly market to, the customer by using short messaging services ("SMS") e-mail or other forms of electronic communication to market its products by specific product announcements, promotional sales, mobile coupons and/or other types of direct marketing offers.

Figure 13:
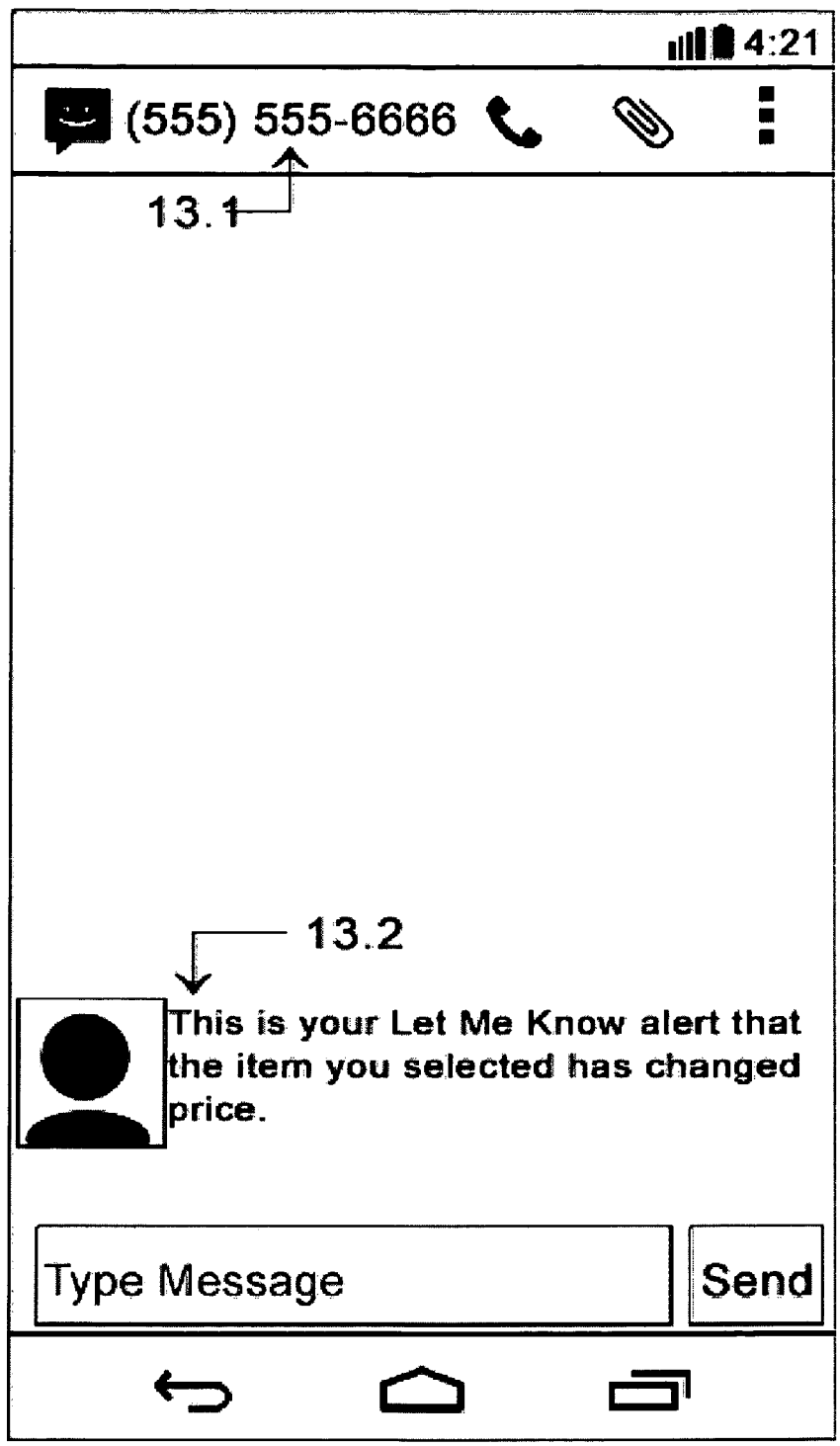
FIG. 13 is a view of the pop-up screen which appears on the opted-in customer's mobile device alerting the customer by Short Message Service sent by the User, that the item or information requested by the customer in the Let Me Know feature is available, in accordance with one embodiment.

In the next depicted embodiment, the customer, from the pop-up window screen FIG. 6, can elect to request that the User inform the customer of a specific event regarding a product or service, by choosing from a drop-down menu, FIG. 7.1; FIG. 7.2; FIG. 7.3; FIG. 7.4; FIG. 7.5. Once customer selects the notification option, which is called the "Let Me Know" option from the drop down menu, the selection is saved and sent to the User's Let Me Know Administration File, FIG. 14, where it is matched with the customer's stored contact information from the customer's prior opt-in registration in the User's Administration File. The customer receives a Confirmation of its selection, FIG. 13.2, FIG. 2. Once the customer chosen event from the Let Me Know option takes place, for example: a product price reduction; a new product version update is released; or a different color for the product comes into stock, the customer is notified of the event by short message service (SMS) text, FIG. 13.1; FIG. 13.2.

Figure 5:
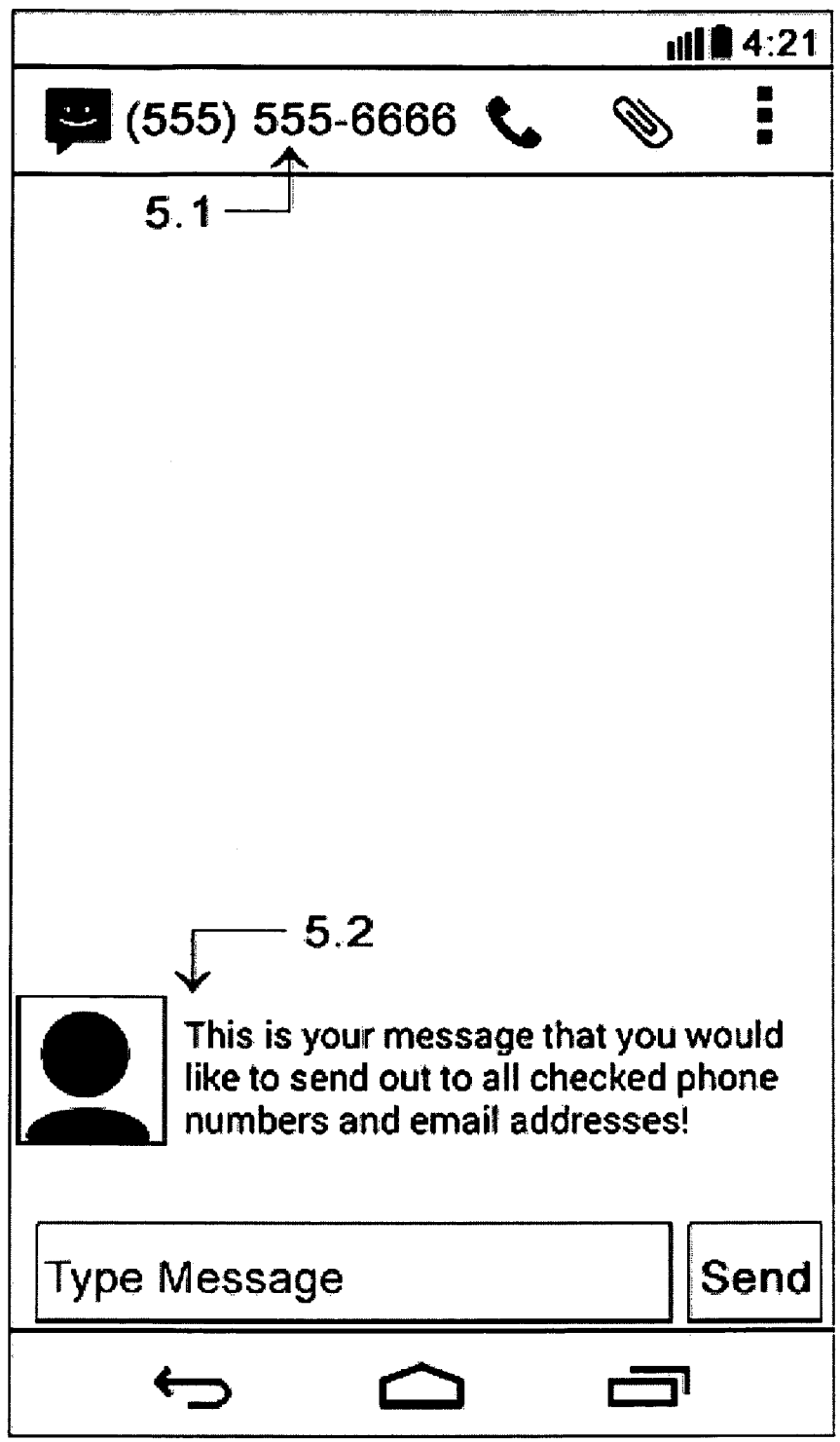
FIG. 5 is a view of the pop-up screen, which appears to the User and permits the user to send a text message to one or more opted-in customers, in accordance with one embodiment.
Figure 8:
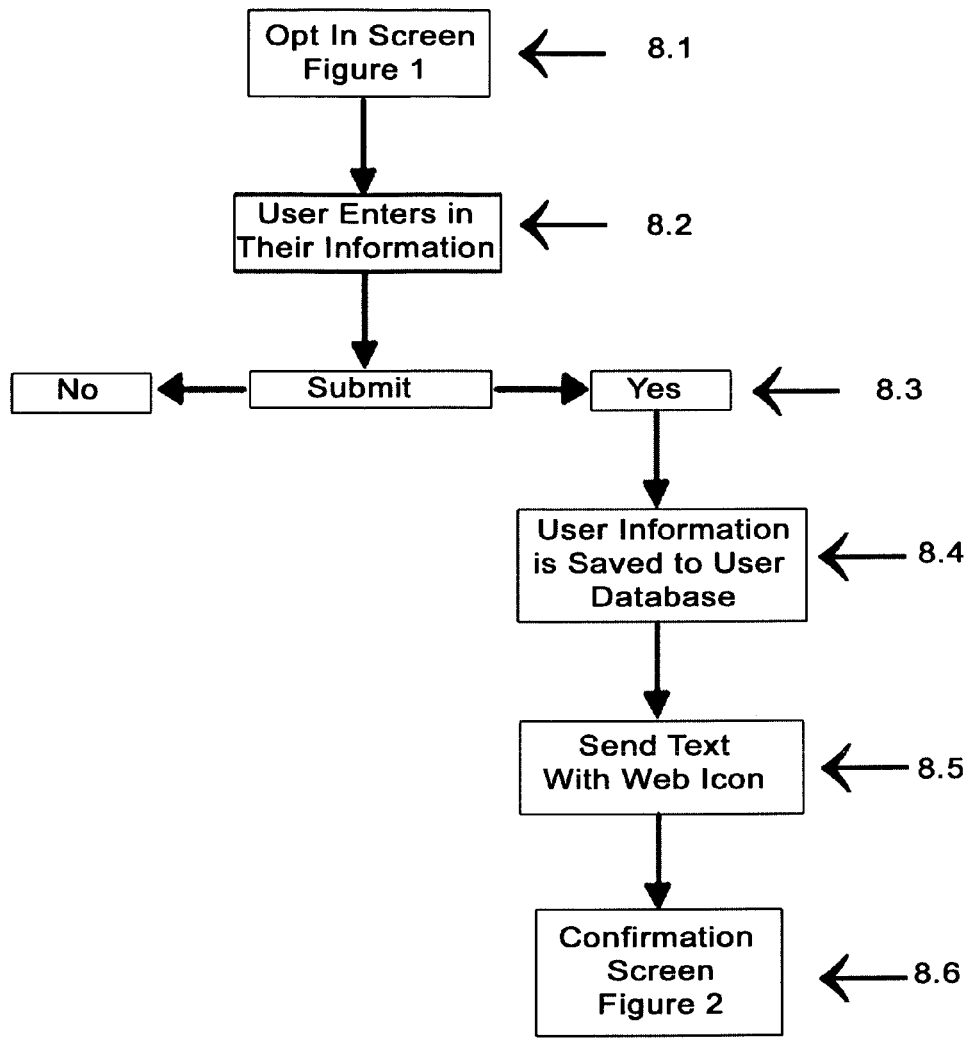
FIG. 8 is a flow chart, which demonstrates the workings of the "Opt-In Procedure" of the present disclosure, in accordance with one embodiment.
Figure 9:
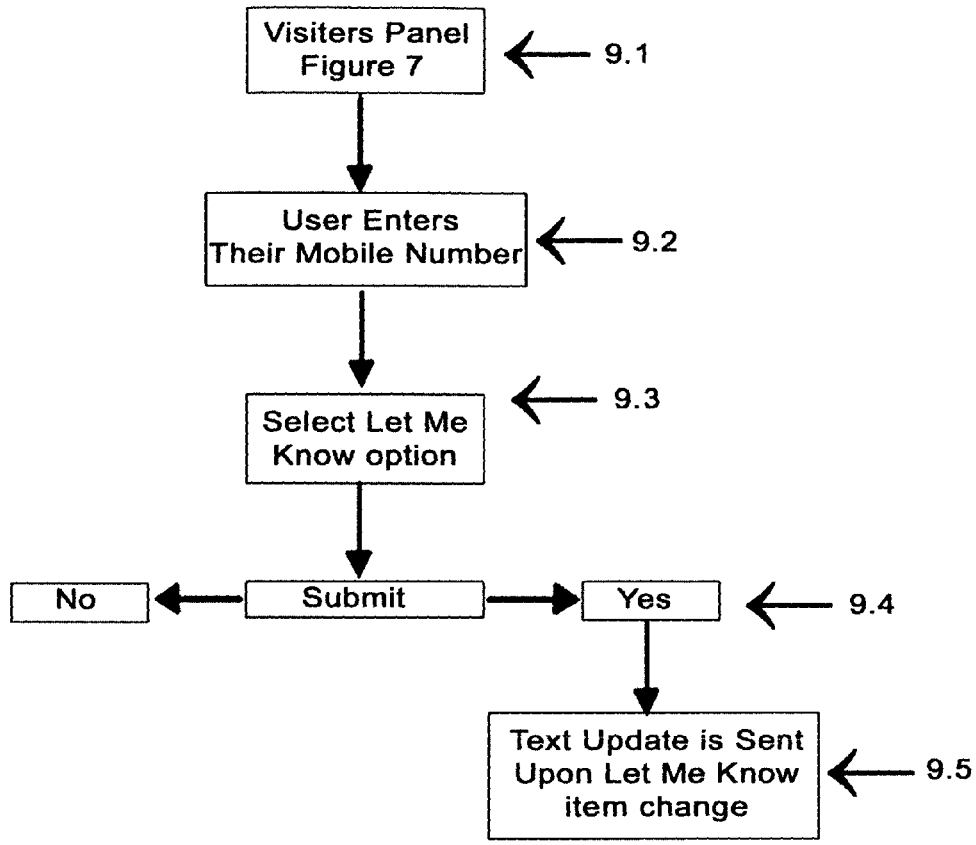
FIG. 9 is a flow chart, which demonstrates the workings of the "Let Me Know Procedure" of the present disclosure, in accordance with one embodiment.
Figure 10:
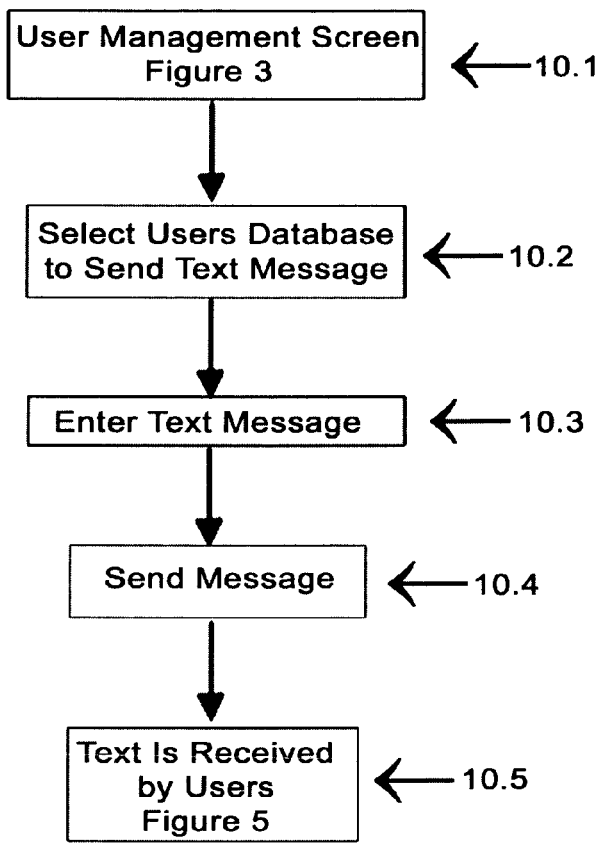
FIG. 10 is a flow chart, which demonstrates the workings of the "Marketing Text Procedure" in the present disclosure, in accordance with one embodiment.

In another embodiment, the User is able to send a web-based short message service (SMS) text to a customer who has previously elected to opt-in to the system and whose contact information has been stored to the User's Administration File, FIG. 3.1. The User will utilize the provided back-end web site Administration Panel, FIG. 3; FIG. 14 to select the customer name and corresponding mobile number(s) and/or e-mail address to send the desired communication, FIG. 3.1; FIG. 3.2; FIG. 3.3; FIG. 3.4. A pop-up window in the provided back-end User's Administration Panel, FIG. 3; will allow the User to enter the customers' phone number, FIG. 4.1, enter the desired message, coupon code, marketing, information notification, etc. and send the desired message. FIG. 5.2, by web based short message service ("SMS") to customers' mobile phone number(s). The customer will receive the short message service ("SMS") communication to its previously opted-in and provided mobile telephone number, FIG. 1.3; FIG. 6.3.

Figure 11:
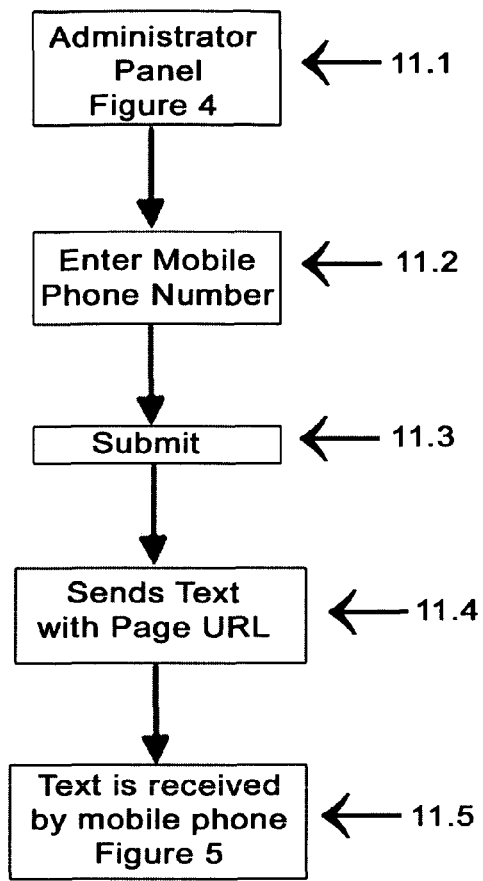
FIG. 11 is a flow chart, which demonstrates the workings of Sending a URL by Short Text Message from the User's website to the opted-in customer, by the User, in accordance with one embodiment.

In another embodiment, the User can send, via web based short message service ("SMS"), a specific URL to a customer who has previously elected to opt-in to the system and receive SMS text messages. The URL can represent a link to the landing page, the check-out page or any product page contained in the User's web site, FIG. 11. The User will utilize the provided Administration Panel, FIG. 3, to access the customer name and corresponding mobile telephone number(s). The User will then enter the customer's mobile telephone number(s), FIG. 4.1, add the URL link to the send message box, FIG. 3.5 and chose send message, FIG. 3.6. The customer will then receive the URL link, via short message service ("SMS") to its previously opted-in and provided mobile telephone number, FIG. 1.3; FIG. 6.3.

Figure 12:
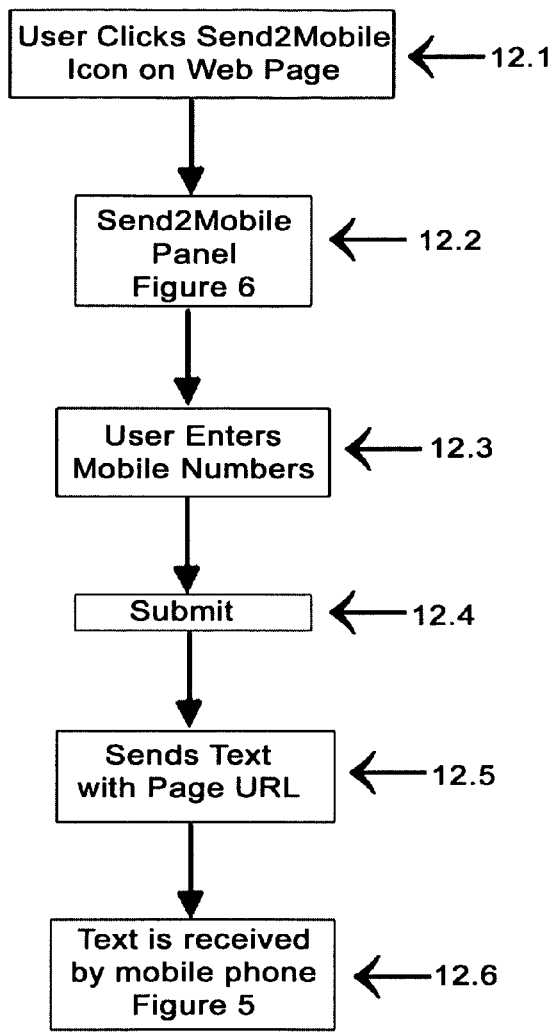
FIG. 12 is a flow chart, which demonstrates the workings of Sending a URL by Short Message Text from the User's website by the opted-in customer to another contact of the customer's choice, in accordance with one embodiment.

In another embodiment, the customer, who has previously opted-in to the User's system, can send, via web based short message service ("SMS") text, a URL link to the User's landing page or any product page, to the mobile telephone number of a friend, relative or business contact. The customer will click on the S2M Icon, which will be located in the social media section on every product page, the landing page and the check-out page of the User's web site, FIG. 12.1. Clicking on the S2M+ Icon will cause a pop-up window to appear, FIG. 6, FIG. 12.2 and the customer will enter the mobile number of its desired recipient, FIG. 12.3 and then enter "Submit", FIG. 12.4. The URL link for that particular product page, landing page or check-out page will then be transmitted to the customer's desired recipient via short message service to the previously entered mobile number, FIG. 12.5; FIG. 12.6.

What is claimed is:

1. A system for facilitating the sale of a product or service via interactive text messaging communication with a customer's mobile computing device capable of sending and receiving text messages, comprising:
    a customer's computing device which is associated with a mobile device number, and a merchant's internet server, which comprises a microprocessor, memory, and a communications interface, programmed to perform the following method:
    display a selectable icon in a merchant's webpage stored in the memory of the merchant's internet server, wherein when the icon is selected by a customer from the customer's computing device:
    cause the microprocessor to display on the customer's computing device a screen prompting a customer to enter customer identification information and a mobile number, and a submit button, which, when selected by the customer, transmits the customer identification information and the mobile number to the merchant's internet server, the customer identification information and the mobile number being written to a customer database residing in the merchant internet server's memory to then be used for interacting with the customer via text messaging;
    display on a merchant's webpage a graphical user interface including one or more of a plurality of data fields, which include events determined by a merchant inviting responses from a customer, the events and responses corresponding to a product or service being sold on a merchant's website, for which a customer wishes to be timely notified via a text message sent to the customer's mobile computing device;
    receive a customer's selection of the event corresponding to a product or service being sold on the merchant website from the customer's mobile computing device and storing the event in the memory of the merchant's internet server;
    determine when an event has occurred;
    generate a text message including text indicating that an event has occurred and display a universal resource locator (URL), which when selected by the customer causes an immediate purchase of the product or service being sold on the merchant's website, when the merchant's internet server determines that the event has occurred;
    cause the communication interface of the merchant's server to transmit the text message to the customer's mobile computing device using the customer's mobile number, immediately after the merchant's server determines that the event has occurred;
    receive, at the customer's mobile computing device, the merchant's generated text message which displays the URL, which when selected by a customer causes an immediate purchase of the product or service being sold on the merchant's website; and
    transmit the customer's immediate purchase of the product or service being sold on a merchant website from the customer's mobile computing device when the customer selects the URL in the received text message or transmit a customer's text message to the merchant requesting additional information or making an offer corresponding to the product or service being sold on the merchant website.

2. The system according to claim 1, wherein the text message is a Short Message Service (SMS) message.

3. The system according to claim 1, wherein the e-Commerce server sends the text message to the mobile device via an SMS server.

4. The system according to claim 1, wherein the operation is sending a second text message to the e-Commerce server in response to the received text message.

5. The system according to claim 1, wherein the predetermined event is one or more of a change in price of an item, updated information regarding the availability of an item, availability of newer versions or models of an item, availability of an item having desired characteristics, a bid on the item, the item is sold, or an update on information relating to the item.

6. The system according to claim 1, wherein the e-Commerce website includes a drop-down menu including a plurality of predetermined events from which a customer can select the predetermined event.

7. The system according to claim 1, wherein the message from the customer's computing device is received via the e-Commerce website.

8. The system according to claim 5, wherein the e-Commerce website includes a user control to display a screen including fields for the customer identification information and the customer's mobile number associated with the mobile device.

9. The system according to claim 8, wherein the screen includes a user selectable option to include a shortcut icon to the e-Commerce website on a screen of the mobile device, and wherein the e-Commerce server pushes the shortcut icon to the screen of the mobile device.

10. The system according to claim 1, wherein the system is an interactive marketing system, and wherein the text message includes an advertisement of goods or services, a promotional coupon, a link to purchase an item, a link to informational websites, a notice regarding a sales event, a communication of an alert, a special offer, a reminder of an appointment, or an invitation for the customer to respond.

11. The system according to claim 1, wherein the e-Commerce server sends a display screen to a user's computing device listing customer identification information and corresponding mobile numbers, and wherein the e-Commerce server receives the selection of a plurality of customers and a message to include in the text message, and sends the text message to each of the plurality of customers using the mobile numbers.

12. The system according to claim 1, wherein the text message includes a link to the e-Commerce website.

13. The system according to claim 1, wherein the e-Commerce server receives a mobile number and information associated with a webpage after an end-user's selection of an icon on a webpage, and wherein the e-Commerce server sends a text message, including the information associated with the webpage, to the mobile number.

14. The system according to claim 13, wherein the icon is located in a social media area of a webpage, and the webpage is associated with a product or service.

* * * * *